Feb. 12, 1963
C. NOKES
3,077,066
LAWN MOWER
Filed Dec. 19, 1960
2 Sheets-Sheet 2
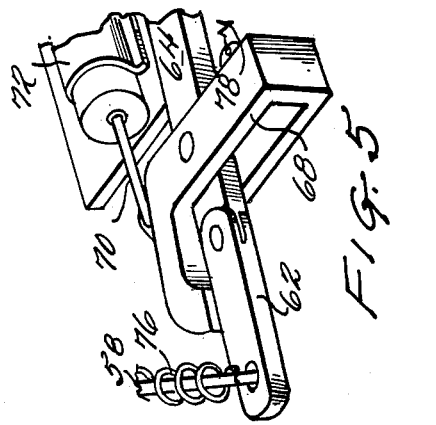
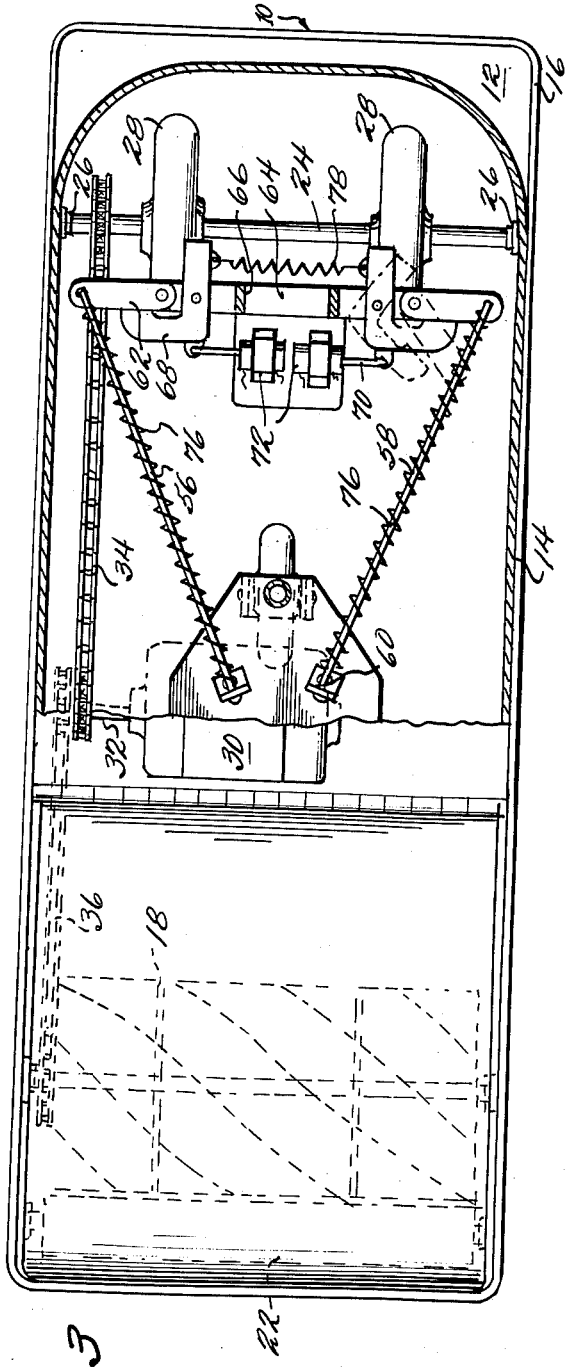
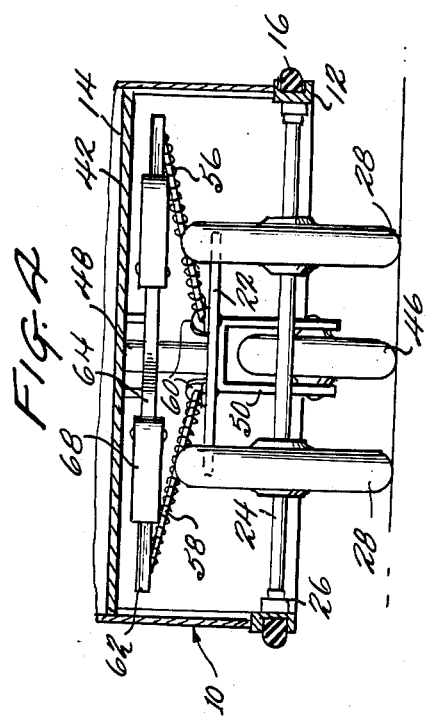
INVENTOR
CLARENCE NOKES
BY
Kimmel & Crowell
ATTORNEYS 3,077,066
LAWN MOWER
Clarence Nokes, Washington, D.C., assignor of twenty-five percent to Warren K. Van Hook, Washington, D.C.
Filed Dec. 19, 1960, Ser. No. 76,627
2 Claims. (Cl. 56—26)

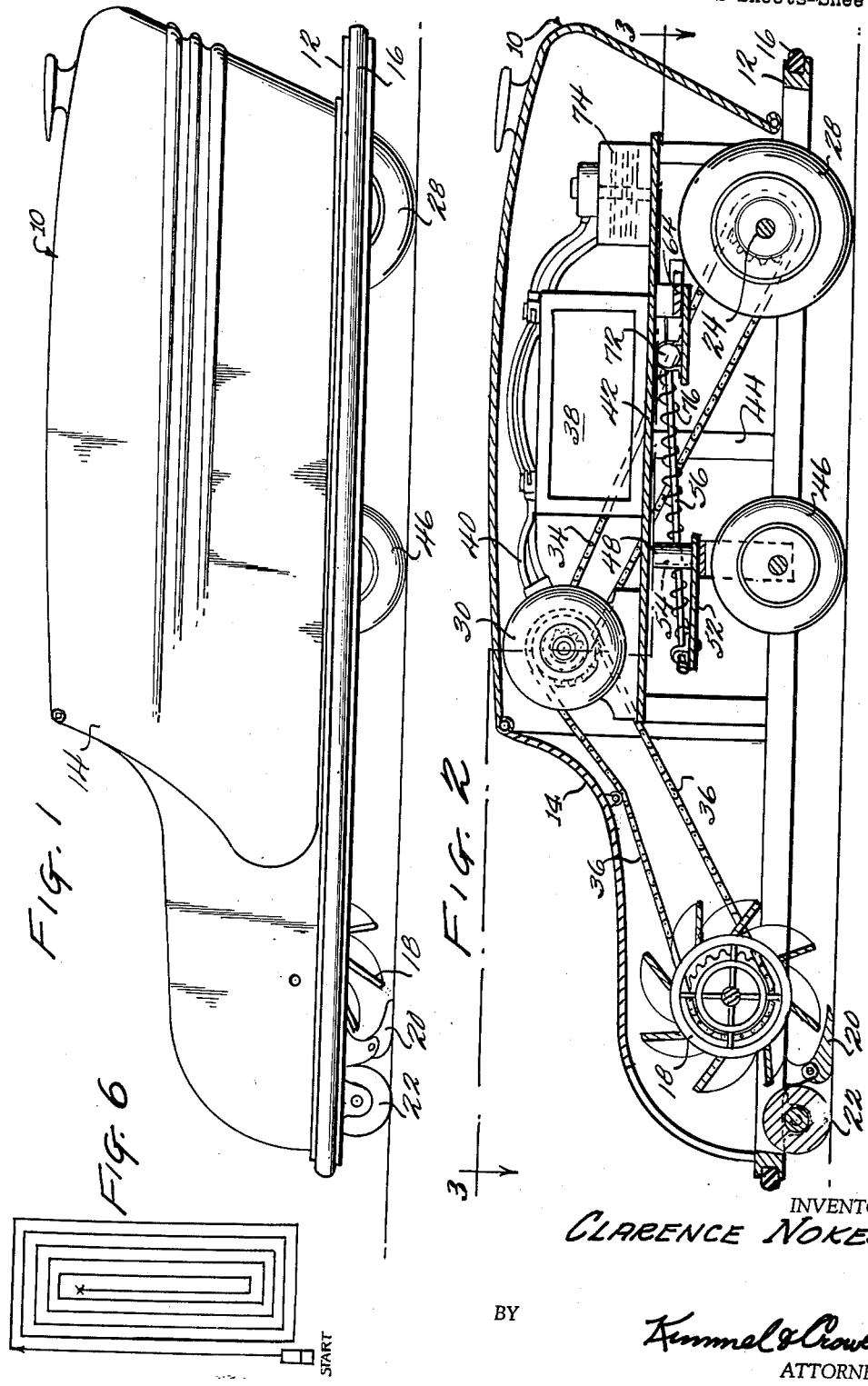

The present invention generally relates to a lawn mower construction and more particularly to a lawn mower of the self-propelled type which is controlled for guiding the lawn mower in a predetermined pattern without any manual control whatsoever.

Lawn mowers of the self-propelled type are generally old and well known but it is the primary object of the present invention to provide a novel self-propelled lawn mower including steerable wheel means provided with an automatic control device for guiding the lawn mower in a pattern for continuous mowing of a given area in a rectangular, square or polygonal spiral path.

Another object of the present invention is to provide a self-propelled and self-controlled lawn mower having novel means for controlling the pivotal position of the steerable wheel means.

A further object of the present invention is to provide a lawn mower of the character described which is simple in construction, easy to operate, dependable in operation, and generally inexpensive to manufacture.

These together with other objects and advantages which will become subsequently apparent, reside in the details of construction and operation as more fully described and claimed, reference being had to the accompanying drawings forming a part hereof, wherein like numerals refer to like parts throughout, and in which:

FIGURE 1 is a side elevational view of the lawn mower of the present invention;

FIGURE 2 is a longitudinal sectional view of the mower illustrating the orientation of components;

FIGURE 3 is a plan sectional view taken substantially upon a plane passing along section line 3—3 of FIG. 2 illustrating further structural details of the invention;

FIGURE 4 is a front elevational view of the invention with the front wall of the housing broken away illustrating the position of the wheels;

FIGURE 5 is a fragmental perspective view illustrating the details of the steering control mechanism; and FIGURE 6 is a schematic plan view of the cutting pattern of the lawn mower.

Referring now specifically to the drawings, the numeral 10 generally designates the lawn mower of the present invention including a peripheral frame 12 and a hollow housing 14 mounted thereon.

The peripheral frame 12 is provided with a resilient bumper 16 for protection of trees and the like in the event of accidental engagement therewith. Also, the dimensions of the housing may vary depending upon the size of the mower.

Disposed in one end of the frame and housing is a transverse rotary reel 18 associated with an adjustable cutter bar 20 thus forming a reel-type mower assembly. Adjacent to the cutter bar, a roller 22 is journalled transversely of the frame 12. The roller may be adjusted for varying the height of the cut of the mower assembly.

At the other end of frame 12 there is provided a transverse axle 24 journalled in bearings 26 and supporting a pair of drive wheels 28 thereon for propelling the mower.

An electric motor 30 or other suitable power source is mounted centrally of the housing and includes an output shaft 32 drivingly connected with axle 24 by a belt or chain drive assembly 34 and connected with reel 18 by a belt or chain assembly 36. The motor 30 receives its power from a storage battery 38 connected thereto by suitable wires 40. The battery 38 and motor 30 are supported by a partial bottom member 42 supported from frame 12 by uprights 44.

A single steerable wheel 46 is supported in depending relation to panel 42 by a sleeve 48 for rotation or swivel movement about a vertical axis. The wheel 46 includes a yoke 50 carried by a horizontal plate 52 and on the opposite side of the plate 52 from an upstanding swivel pin 54 received in sleeve 48. By pivoting wheel 46 about generally a vertical axis the mower 10 may be readily controlled by changing the direction of pivotal movement of wheel 46.

FIGURES 3 and 5 illustrate the details of the steering control mechanism including a pair of forwardly diverging rods 56 and 58 connected to plate 52 by pivoted brackets 60. The forward end of each rod 56 and 58 is connected to the outer end of a pivotal link 62 having the other end pivotally connected to a transverse support member 64 carried by depending brackets 66. Adjacent each end of support member 64 is a bell crank 68 pivotally supported therefrom adjacent the apex of the bell crank. One leg of bell crank 68 is engaged with link 62 and the bell crank is also provided with an actuator rod 70 pivotally connected thereto.

The actuator rod 70 is connected with the movable core or armature of a solenoid 72. The solenoids 72 are energized from battery 38 through a conventional and commercially available timer 74 of a type which can be similar to those shown in the patent to Morrison 2,662,943 or Medler 2,892,906, for automatically controlling the operation and direction of travel of the mower. Each rod 56 and 58 is provided with a wheel centralizing spring 76 and the bell cranks 68 are interconnected by a spring 78 biasing the bell cranks 68 to a normal position and also biasing wheel 46 to straight condition.

In operation, the timer 74 will actuate the solenoids 72 at the proper timed intervals for causing the mower to follow a pattern such as is illustrated schematically in FIGURE 6. Beginning at an outside corner of a rectangular area the mower will move in a decreasing spiral like path in which the timer is programmed for turning the mower at the proper timed intervals. Suitable speed change mechanisms may be provided for varying the rotational speed of the reel in relation to the traverse speed of the mower. Once the timer has been set up for a particular area, it is only necessary to start the mower and timer at the proper point for automatically mowing the area without manual guidance.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:
1. A mower comprising a frame, a mower assembly mounted on the frame, drive wheel means mounted on the frame in longitudinally spaced relation to the mower assembly, steerable wheel means mounted on the frame in longitudinally spaced relation to the mower assembly, power means mounted on said frame, means interconnecting the power means and the mower assembly, means interconnecting the power means and the drive wheel means, and control means mounted on the frame and connected with the steerable wheel means for pivoting the steerable wheel means about a generally vertical axis at predetermined timed intervals thereby causing the mower to travel in a predetermined pattern, wherein said steerable wheel means includes a single wheel mounted on the frame for pivotal movement about a vertical axis, a yoke mounting the single wheel on the frame, and a plate attached to said yoke for connection with the control means wherein said control means includes a pair of solenoids, rod means interconnecting said solenoids and said plate for operation of the plate in response to energization of the solenoids, and a timer for programming operation of the solenoids.

2. The mower as defined in claim 1 wherein said power means includes a battery, a motor connected with the battery for driving the mower assembly and drive wheel means, said timer selectively connecting the battery to the solenoids at predetermined intervals for automatically controlling the path of movement of the mower.

References Cited in the file of this patent
UNITED STATES PATENTS

| | | |
|---|---|---|
| 2,698,507 | Siebring | Jan. 4, 1955 |
| 2,708,977 | Scheppe | May 24, 1955 |
| 2,794,308 | Cavanaugh | June 4, 1957 |
| 2,815,633 | Meyer | Dec. 10, 1957 |
| 2,847,077 | Vaughan | Aug. 12, 1958 |
| 2,978,056 | Clements | Apr. 4, 1961 |